United States Patent [19]

Barr

[11] 3,777,285

[45] Dec. 4, 1973

[54] ELECTRICAL SOCKET ADAPTOR MEMBER

[75] Inventor: John Edward Barr, Brea, Calif.

[73] Assignee: International Telephone and Telegraph Corporation, New York, N.Y.

[22] Filed: June 19, 1972

[21] Appl. No.: 263,926

[52] U.S. Cl. ................. 339/17 CF, 339/19, 339/218

[51] Int. Cl. ................................................ H05k 1/02

[58] Field of Search ......................... 339/17, 218, 19, 339/18

[56] References Cited

UNITED STATES PATENTS

| | | | |
|---|---|---|---|
| 3,685,002 | 8/1972 | Kennedy | 339/17 CF |
| 3,065,440 | 11/1962 | Bonwitt et al. | 339/19 |

*Primary Examiner*—Marvin A. Champion
*Assistant Examiner*—Terrell P. Lewis
*Attorney*—C. Cornell Remsen, Jr. et al.

[57] ABSTRACT

An electrical socket adaptor member for interconnecting an electrical circuit element having a plurality of electrical contacts extending therefrom with a mounting member having conductive members positioned therein. A body of insulation material has a plurality of openings extending from a first side of the insulating material to a second side thereof. Conductive spring members in the insulation have a portion secured from the periphery of the openings and extending away from the conductive material. The conductive spring members have a portion thereof which is expandable to contact the conductive members of the mounting members. The conductive spring members expand to contact the conductive members upon insertion of the electrical circuit element contacts. The insulation material is molded around the conductive spring members. Each of the circuit elements of the electrical contacts are positioned in one of the openings in the insulation material and contact an internal surface of conductive spring members. The external surface of the spring members contact the conductive members of the mounting member.

3 Claims, 5 Drawing Figures

ELECTRICAL SOCKET ADAPTOR MEMBER

The invention relates, in general, to electrical socket adaptor members and, more particularly, to a device for interconnecting an electrical circuit element having a plurality of electrical contacts extending therefrom with a mounting member having conductor members positioned therein.

BACKGROUND OF THE INVENTION

Conventionally, dual-in-line package sockets consist of a two-piece molded dielectric body or housing. Individual contacts for each leg of the packaged socket are provided. The contacts are assembled into one portion of the body, and then the other half of the body is bonded or snapped onto the contact body assembly. This type of construction results in a multiplicity of components which raises the cost of the finished product. Further, the finished part is larger; that is, requires more volume than is absolutely necessary. These two latter-mentioned considerations are of major importance for components used in high-density packaged, high-production volume electronic units. An additional disadvantage with available dual-in-line package sockets concerns the fragile nature of the package device itself. A force used to insert or extract the device from the normal type socket must be transmitted through the device itself. Therefore, with high contact forces being desirable, the loads imposed upon the dual-in-line package socket will be high, thereby increasing the chances of damage to the package.

The present invention overcomes the disadvantages of prior art dual-in-line package sockets. Production costs are kept low by eliminating components and using high-production techniques with a minimum of assembly required. To obtain high contact forces without loading the dual-in-line package socket, the package is placed in a socket, and then the entire assembly is inserted into a printed circuit board. The forces, which are high for good contact, are applied through the socket and not through the dual-in-line package itself. This prevents damage to the dual-in-line package. In addition, the removal of the dual-in-line package and socket is accomplished by applying force to the socket only.

SUMMARY OF THE INVENTION

The invention comprises an electrical socket adaptor member for interconnecting an electrical circuit element having a plurality of electrical contacts extending therefrom with a mounting member having conductive members therein. The socket member comprises insulation material having a plurality of openings extending from a first side of the insulation material to a second side thereof. Conductive spring members in the insulation have a portion secured to the periphery of the openings and extend from the conductive material. The conductive spring members have a portion which is expandable to contact the conductive members of the mounting member. The conductive spring members expand to contact the conductive members upon insertion of the electrical circuit element contacts. The insulating material is molded around the conductive spring members. Each of the circuit elements of the electrical contacts are positioned in one of the openings of the insulating material and contact an internal surface of the conductive spring members, the external surface of the spring members contacting the conductive members of the mounting member.

The advantages of the invention, both as to its construction and mode of operation, will be readily appreciated as the same becomes better understood by reference to the following detailed description when considered in connection with the accompanying drawings in which like-referenced numerals designate like parts throughout the figures.

DESCRIPTION OF THE PREFERRED EMBODIMENTS

Figure 1:
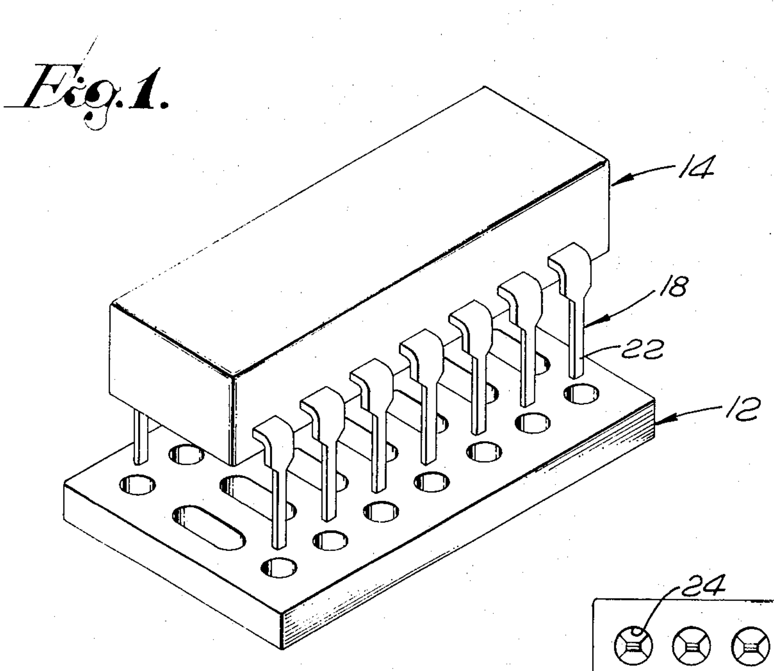
FIG. 1 is a perspective view illustrating the electrical socket adaptor member in accordance with the invention.

Referring now to FIG. 1, there is shown an electrical socket adaptor member 12 which may be used to interconnect an electrical circuit member 14 to a mounting member. The electrical circuit member 14, normally referred to as a dual-in-line plug, comprises a plurality of electrical contacts 18 each extending from one side of the electrical device 14 and containing contact portions 22. Normally, the electrical circuit member 14 may be an integrated circuit or other electrical circuit element.

Figure 2:
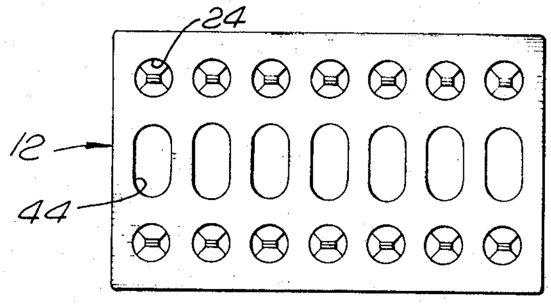
FIG. 2 is a top view of the adaptor member of FIG. 1.

The electrical socket adaptor member 12, shown in top view in FIG. 2, is generally rectangular in shape and contains a plurality of openings 24 therein. The openings extend from a first side or top surface of the member 12 to a bottom side or second surface thereof. The openings 24 are formed of a pair of rows extending lengthwise along the adaptor member 12 and are spaced so that each of the contacts 18 may be inserted into one of the openings.

Figure 3:
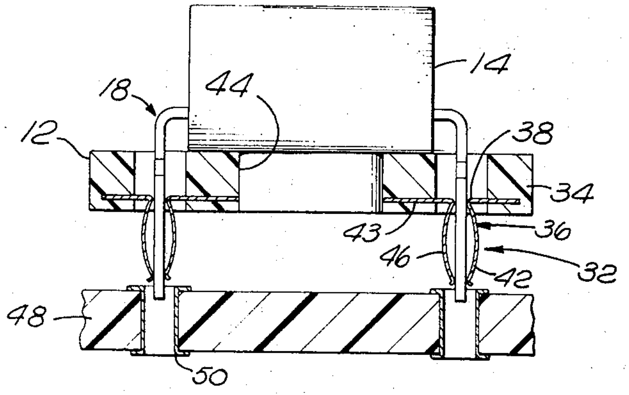
FIG. 3 is an assembled view, partly in section, of an electrical device secured to the adaptor member of FIGS. 1 and 2 prior to insertion in a mounting member.

Positioned in the openings are conductive spring members 32 shown more clearly in FIG. 3. The spring members 32 are normally molded integral with the insulating section 34 of the adaptor member. Typically, the spring members may be made of an outer half 36 which is generally L-shaped in section and contains a top inner spring portion 38 and a bottom spring portion 42. In addition, inner portions 43 of the spring members 32 may be joined together so as to form a bussing connection between opposed pairs of spring members. Should it be desirous to eliminate the bussing connection, elongated openings 44 formed in the insulating material 34 are punched through the insulator thereby severing the spring members. The inner spring members 43 further contain a central contacting section 46 which bulges opposite the outer half 36 and depends below the bottom surface of the insulating material 34. Typically, the electrical circuit element 14 is connected to a conventional mounting member such as a printed circuit board 48 having electrical contacts 50 positioned therein. In the embodiment shown in FIGS. 3 and 4, the contact elements 50 protrude through the circuit board 46 and may be secured at the top and bottom to electrical wiring.

Figure 4:
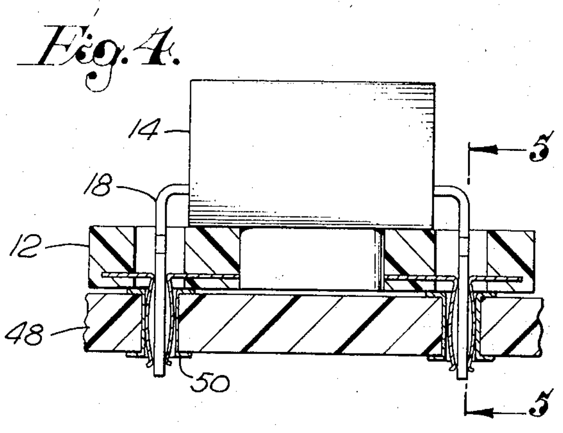
FIG. 4 is a view, partly in section, of the device of FIG. 3 with the adaptor member interconnecting an electrical circuit element with the mounting member.
Figure 5:
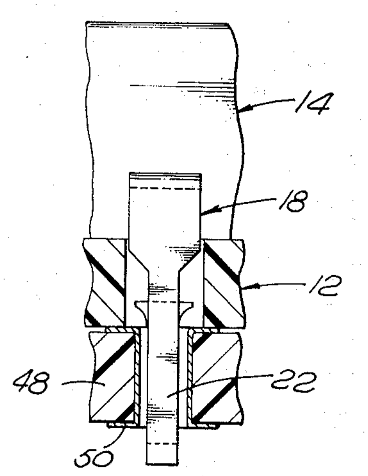
FIG. 5 is a view, partly in section, of the electrical connector member of FIG. 4 taken along the line 5—5 thereof.

In assembly, initially the circuit element is inserted so the contacts 18 pass through the conductive spring members 32 and make electrical contact at the opposite ends of the bulge formed in the spring members. At this point, the assembly, as shown in FIG. 3, has been formed. Then the adaptor socket member is inserted onto the printed circuit board 48 so that the bulging sections of the conductive spring members 32 abut the inner surface of the contacting portions 50 of the printed circuit board. Thus, the electrical contacts 18 are connected to the inner surface of the conductive spring members 32 and the outer surface of the spring members are electrically connected to the contacts 50. The assembled package is shown in FIGS. 4 and 5.

To remove the electrical circut form the printed circuit board, it is merely necessary to remove the socket adaptor member 12 from the printed circuit board. Thus, no pressure need be applied to the electric circuit element 14. As can be readily seen, the electrical circuit element 14 is thus protected from the printed circuit board and may be readily assembled thereto. In addition, the adaptor member 12 can be readily made of different lengths for assembling different size electrical circuit elements to different size printed circuit boards.

It should be further understood that the foregoing disclosure relates only to preferred embodiments of the invention, and it is intended to cover all changes and modifications of the examples of the invention herein chosen for the purpose of the disclosure which do not constitute departures from the spirit and scope of the invention.

What is claimed is:

1. An electrical socket adaptor member for interconnecting an electrical circuit element having a plurality of electrical contacts extending therefrom with a mounting member having openings therein lined with conductive material, comprising:

a body of insulation material having a plurality of openings extending from the upper side of said insulation material to the lower side thereof;

conductive spring members associated with each of said openings in said insulation body; and each said conductive spring member comprising a pair of spring elements having upper, intermediate and lower portions, said upper portions of said spring elements being mounted in said insulation body and extending toward each other into said opening to provide closely adjacent contacting edges for frictionally engaging one of said electrical circuit element contacts, said intermediate portions of said spring elements extending downwardly through said opening below said lower side of said insulation body and terminating in said lower portions, said intermediate portions being bowed in opposed directions for frictionally engaging the conductive lining in said opening, and said lower portions having ends which are positioned closely adjacent to each other for frictionally engaging said electrical contact.

2. An electrical socket adaptor member, in accordance with claim 1, wherein said bowed intermediate portions expand to contact said conductive lining upon insertion of said electrical circuit element contact into said spring member between said spring elements.

3. An electrical socket adaptor member in accordance with claim 1 including integral bussing means joining adjacent spring members.

* * * * *